Oct. 9, 1951 V. A. GREY 2,570,441
SEALING STRUCTURE
Filed Jan. 8, 1947
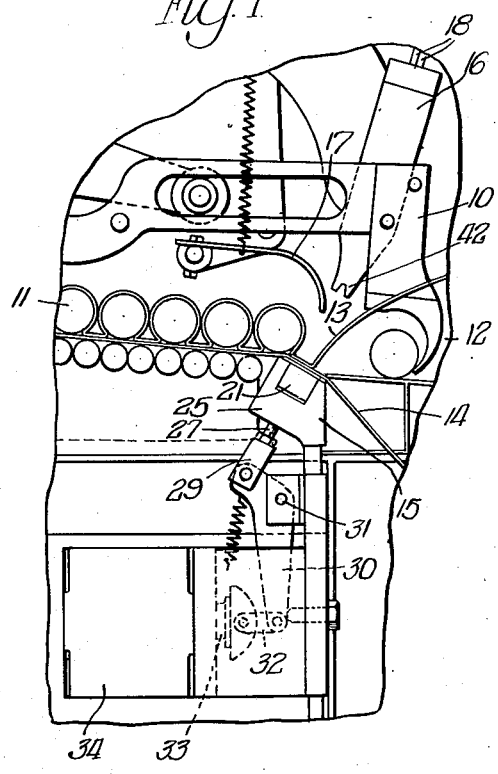
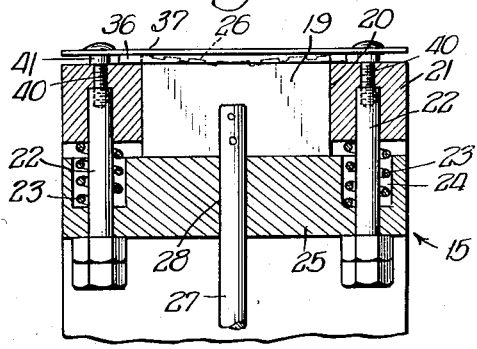
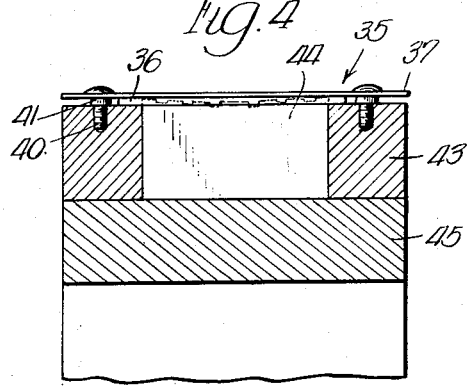
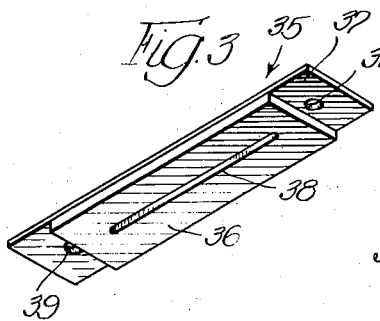
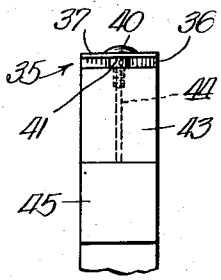
INVENTOR.
Victor A. Grey,
BY
Cromwell, Greist + Warden
Attys.

Patented Oct. 9, 1951

2,570,441

UNITED STATES PATENT OFFICE 2,570,441

SEALING STRUCTURE

Victor A. Grey, Chicago, Ill., assignor to Kartridg-Pak Machine Co., Chicago, Ill., a corporation of Illinois Application January 8, 1947, Serial No. 720,875

4 Claims. (Cl. 154—42)

This application is a continuation in part of my copending application Serial No. 585,710, filed March 30, 1945. The present invention pertains to further improvements in the heat-and-pressure sealing support or platen employed in the machine which is the subject of said application, for the wrapping of a web-like banding material about articles fed through the machine in series and the securement of the material in article banding position.

It is an object of the present invention to provide an improved platen for a heat sealing mechanism of the above type which is adapted to retain maximum heat at the sealing point so as to insure rapid and thorough fusing of the heat sealing material carried by the banding web.

A further object is to provide a wear-resistant, metal faced sealing platen which is well insulated against heat loss by conduction and is characterized by a resilient yieldability under the force applied thereto by a coacting heated sealing member.

A still further object is to provide a sealing and cutting platen of improved thermally insulated, resiliently supported and wear resistant, armored surface character, in combination with web perforating or severing means adapted to partially or wholly sever the article banding material between successive articles coincident with the heat sealing of said material between the articles.

The foregoing statements are indicative in a general way of the nature of the invention, but other and more specific objects will be apparent to those skilled in the art upon a full understanding of the construction and operation of the device.

Various embodiments of the invention are presented herein for purpose of exemplification, and it will be appreciated that the invention is susceptible of incorporation in other modified forms coming equally within the scope of the appended claims.

In the drawings,

Fig. 1 is a fragmentary view in side elevation, illustrating the sealing and cutting platen of the present invention in its preferred association with a coacting reciprocable heat sealing member, as well as with article-advancing means, web tucking means, and certain other means characterizing the copending application identified above;

Fig. 2 is an enlarged fragmentary view in transverse vertical section through the improved platen and the supporting means therefor, in accordance with one embodiment of the invention;

Fig. 3 is a bottom perspective view, illustrating the yieldable armored platen facing constituting an important element of the present invention;

Fig. 4 is a fragmentary sectional view, generally similar to Fig. 2, illustrating the platen construction as associated with a rigid support in accordance with another embodiment of the invention; and Fig. 5 is a fragmentary view in side elevation further illustrating the platen of Fig. 4.

The present invention provides an improved heat sealing and cutting or perforating platen having a wide field of adaptability to article wrapping or packaging machines in which an article or series of articles is banded by a web or webs of flexible fibrous material, and in which a heat sealed connection serves to secure said material about the article. A high capacity, continuous output machine of the type referred to is illustrated and described in my copending application identified above. In that apparatus a pair of webs are associated on either side of an advancing article adjacent a sealing point, said webs being thereafter heat sealed together immediately adjacent the rear of the advancing article by the coaction of a heated reciprocable sealing member and a coacting platen. The seal is effected by a thermally fusible material with which one or both of the webs is preliminarily treated. The patents to Seiferth, No. 2,379,934 and Seiferth, et al. No. 2,379,935 of July 10, 1945, are illustrative of the product and method improved in this sealing operation. Some difficulty has heretofore been experienced in properly sealing the web materials, traceable primarily to the fact that the prevailing use of a metallic platen of considerable thickness and mass permits immediate dissipation of heat through the platen by conduction, plus some radiation, with the result that insufficient heat is present at the sealing point and the webs to be sealed to permit an effective fusion of the sealing material, particularly in the short period of time available for the sealing contact. Moreover, a full contact of the sealing member and platen does not always take place, due to the quite possible misalignment of the latter. In other words, the sealing heat is not always applied uniformly and concentratedly.

The present invention eliminates these objections by affording a thermally insulated, wear resistant and resiliently supported, hence self-aligning, platen surface of small mass and conductivity, in the form of a steel sheathing or platen facing supported by a resiliently compressible, non-conductive cushion which serves as an insulating element retaining the heat in the steel facing sufficiently to insure retention of an adequate, rapid-sealing temperature at the sealing point.

In the drawings, and in particular in Fig. 1 thereof, I illustrate a section of a packaging or banding machine of the type shown and described in my copending application identified above. This includes means in the form of a reciprocable, hook-shaped advancing member 10 adapted to centrally engage elongated articles 11, such as wieners or sausages, which are transported to member 10 on a chain type conveyor 12, and to forward such article into contact with the rearmost of a preceding series of banded articles, thereafter advancing the series a predetermined distance. A pair of banding webs 13, 14 are supplied from appropriate means (not shown) to a point over a platen, which is generally designated 15, so that the article advanced by member 10 is positioned for subsequent encircling engagement by the web 13, in a manner which will be apparent from an inspection of Fig. 1. An oscillating tucker 17 then conforms the web 13 about the last mentioned article, as fully illustrated and explained in the application referred to, whereupon a heated reciprocable sealing member 16 travels downwardly and forwardly for sealing engagement with the two juxtaposed webs 13, 14, said member coacting with the platen 15 in effecting a seal of the webs. The sealing member 16 is resistance heated through a circuit including leads 18 to a temperature sufficient for rapid fusion of the heat sealing material previously applied to the adjacent surfaces of webs 13, 14. A perforating or cutting blade 19 is provided for coaction with platen 15, said blade being receivable in a slot 20 in an upper platen head 21 (see Fig. 2), and being adapted to be projected relative to and exposed through the top of said head as the latter is resiliently depressed by the sealing member. As clearly illustrated in Fig. 2, the head 21 has a floating support, being carried on laterally spaced, vertical pins 22 which are encircled by coil compression springs 23 disposed in recesses 24 in a fixed lower supporting block 25. Stop nuts and lock nuts hold the pins from beneath said block. Hence, as the head 21 is depressed against the resistance of springs 23, the blade 19 is projected above the top of the head into severing relation to the webs 13 and 14, all as described in my copending application, Serial Number 585,710. In order to cause a perforation of said webs, the inclined upper cutting edge of the blade is serrated at 26.

As also described in my application referred to above, it is desirable that the advancing articles 11 be separated into units of a predetermined number for packing or cartoning; hence there is provided means for positively reciprocating the blade 19 upwardly a further distance at predetermined intervals in the operation of the machine, so as to completely cut through the webs banding the articles. This reciproating means comprises an elongated thrust rod 27 secured to the blade and extending through a central bore 28 in block 25, said rod being pivotally connected at its other end by an appropriate adjustable connector 29 to the short arm of a bell crank or actuating lever 30. Lever 30 is medially pivoted on the frame of the apparatus at 31 and its longer arm is pivotally connected by a link 32 to the reciprocable core or plunger 33 of a solenoid, generally designated 34. This solenoid is controlled by means, described in detail in the above application but not necessary to enlarge on here, so as to actuate the blade 19 at predetermined times and thereby effect a severance of the webs as the blade is thrust upwardly above the platen member 21.

The reference numeral 35 generally designates an improved cushioned and insulated facing member which is applied to the upper surface of the platen head 21. Member 35 comprises a rectangular cushioning member 36 of rubber or the like, which is bonded by vulcanization, molding or cementing to the lower surface of a relatively thin, rectangular facing plate 37 of wear resistant steel which is of corresponding width but somewhat greater length. Plate 37 and cushion 36 are traversed centrally by an elongated slot 38 adapted to be aligned with the slot 20 of the platen head 21, and the plate 37 in addition has a pair of apertures 39 on its opposite, cushion-overhanging edges for the reception of headed guide screws 40 which secure the facing to the platen head. Each of the screws carries an enlarged shoulder 41 fitting loosely in an aperture 39 of the facing plate, so as to enable vertical floating movement of plate 37 on said shoulders as the facing 35 is compressed under the force of sealing member 16. The screws restrain plate 37 in the vertical direction and are threaded into the upper ends of the platen head guide pins 22.

In operation, as the heated sealing member 16 engages the superposed webs 13, 14 lying over the platen facing plate 37, the latter will yield sufficiently, due to its resilient cushion 36, to align the facing perfectly in flat face contact with the coacting nose 42 of the sealing member, throughout the entire area of contact thereof. Accordingly, full intensity and uniformity of application of heat results throughout the zone to be sealed. Thereafter, in the form of the invention illustrated in Figs. 1 and 2, head 21 may yield downwardly against the force of springs 23, just as illustrated and described in the referred to application. The webs are sealed together and perforated by blade 19, and insurance is had that a full and effective fusion of the sealing material will take place, inasmuch as cushion 36 serves as an insulator preventing too rapid loss of heat from facing plate 37 by conduction. The metal facing 37 contributes to this end by its slight mass and resultant retention of heat at the sealing surface. It also affords a very wear-resistant surface, adapted for a long life of use.

In Figs. 4 and 5 I illustrate the facing or shield 35 in an alternative application to a platen or support of a rigid nature, comprising the slotted head 43, in which a blade 44 is disposed, said blade resting on a block or cross bar 45 which also rigidly sustains the head 43. The arrangement may be as illustrated in Figs. 4 and 5, i. e., such that full severance of the web or webs will take place as the face plate 37 is depressed on its resilient cushion 36 by the force of the coacting sealing member, thereby exposing the blade above the face plate. Alternatively, only partial severance or perforation may be performed on this stroke, full severance being accomplished by a properly timed reciprocating means for the blade, of the type illustrated in Figs. 1 and 2.

Full sealing heat is retained at the sealing zone, just as in the embodiment previously described, and the self aligning feature is present in all respects. This structure is very simple and inexpensive, yet very satisfactory and successful in operation through a long life.

I claim:

1. In a platen, a support and a facing thereon, said facing comprising a thin, wear-resistant plate having a layer of resilient, non-metallic cushion material applied thereto which is engageable with said support to yieldably cushion said plate under the action of a coacting sealing member, said plate and cushion member having an aperture therethrough, a cutting element disposed in said aperture for exposure above the plate upon movement of the latter by engagement with said sealing member, said support including means rearwardly sustaining said cutting element, and means to guide the plate for floating movement relative to said cutting element and support coincident with said engagement, said cushion member normally supporting said plate in predetermined shielding relation to said element and being compressible to expose said element above said plate.

2. In a platen, a rigid support and a facing thereon, said facing comprising a plate having a layer of resilient non-metallic cushioning material applied thereto which is non-heat conductive and is engageable with said support to yieldably cushion said plate and to oppose heat loss therefrom under the action of a coacting heated sealing member, said plate and cushion member having an aperture therethrough, a cutting element disposed in said aperture for exposure above the plate upon movement of the latter by engagement with said sealing member, said support including means rearwardly sustaining said cutting element, and means to guide the plate for floating movement relative to said cutting element and support coincident with said engagement, said cushion member normally supporting said plate in predetermined shielding relation to said element and being compressible to expose said element above said plate.

3. In a platen for coaction with a heated sealing member in a heat sealing operation, a support and a facing thereon, said facing including a relatively thin, wear resistant plate, and an interposed layer of resilient non-metallic cushioning material disposed between the plate and support, said layer being engageable with said support to cushion and uniformly support and align the plate under compressive force applied to the latter by said sealing member, means laterally guiding said plate for floating movement relative to said support under said force, said last named means having means coacting with the plate to restrain the same against vertical movement in the opposite direction, and means to yieldably urge said facing in said opposite direction.

4. In a platen for coaction with a heated sealing member in a heat sealing operation, a support and a facing thereon, said facing including a relatively thin, wear resistant plate, and an interposed layer of resilient non-metallic cushioning material disposed between the plate and support, said layer being engageable with said support to cushion and uniformly support and align the plate under compressive force applied to the latter by said sealing member, means laterally guiding said plate for floating movement relative to said support under said force, said last named means having means coacting with the plate to restrain the same against vertical movement in the opposite direction, means to yieldably urge said facing in said opposite direction, said plate and cushioning element being provided with an elongated aperture between said guiding means, and a cutting element in said aperture adapted to be exposed above the plate coincident with said floating movement.

VICTOR A. GREY.

REFERENCES CITED

The following references are of record in the file of this patent:

UNITED STATES PATENTS

| Number | Name | Date |
| --- | --- | --- |
| 808,479 | Riddle | Dec. 26, 1905 |
| 1,719,607 | Harvey | July 2, 1929 |
| 2,020,776 | Goebel | Nov. 12, 1935 |
| 2,323,216 | Goldschmidt | June 29, 1943 |
| 2,390,550 | Moore | Dec. 11, 1945 |
| 2,391,539 | Avery | Dec. 25, 1945 |
| 2,395,387 | Fry | Feb. 26, 1946 |
| 2,405,675 | Southwick | Aug. 13, 1946 |
| 2,414,157 | Marziani | Jan. 14, 1947 |
| 2,425,388 | Oestricher | Aug. 12, 1947 |
| 2,433,176 | Van Epps | Dec. 23, 1947 |